United States Patent
Clark

(10) Patent No.: US 10,108,594 B2
(45) Date of Patent: *Oct. 23, 2018

(54) SYSTEMS AND METHODS FOR APPLYING A RESIDUAL ERROR IMAGE

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/260,752

(22) Filed: Sep. 9, 2016

(65) Prior Publication Data
US 2016/0378730 A1  Dec. 29, 2016

Related U.S. Application Data

(63) Continuation of application No. 13/725,127, filed on Dec. 21, 2012, now Pat. No. 9,442,904.

(51) Int. Cl.
| | | |
|---|---|---|
| *G06F 17/00* | (2006.01) | |
| *G06F 17/22* | (2006.01) | |
| *G06F 17/30* | (2006.01) | |
| *H04N 19/503* | (2014.01) | |
| *H04N 19/137* | (2014.01) | |
| *H04N 19/182* | (2014.01) | |
| *H04N 19/90* | (2014.01) | |
| *H04N 19/174* | (2014.01) | |
| *H04N 19/513* | (2014.01) | |
| *G06T 11/60* | (2006.01) | |

(52) U.S. Cl.
CPC ...... *G06F 17/2247* (2013.01); *G06F 17/2252* (2013.01); *G06F 17/30017* (2013.01); *G06T 11/60* (2013.01); *H04N 19/137* (2014.11); *H04N 19/174* (2014.11); *H04N 19/182* (2014.11); *H04N 19/503* (2014.11); *H04N 19/521* (2014.11); *H04N 19/90* (2014.11)

(58) Field of Classification Search
CPC ............. G06F 17/2211; G06F 17/2264; G06F 17/30017
See application file for complete search history.

(56) References Cited

U.S. PATENT DOCUMENTS

| | | | |
|---|---|---|---|
| 6,313,780 B1 | 11/2001 | Hughes | |
| 7,054,502 B2 * | 5/2006 | Nakano | H04N 5/217 348/223.1 |

(Continued)

*Primary Examiner* — Stephen Hong
*Assistant Examiner* — Gregory Vaughn
(74) *Attorney, Agent, or Firm* — Fish & Richardson P.C.

(57) ABSTRACT

Systems and methods described herein enable a residual error image to be added and rendered in an existing HTML canvas using native primitives. A current image and a residual error image containing pixel value differences between the current image and an updated image are received. A positive residual error image and a negative error image are generated from the residual error image. The positive residual error image is added to the current image to generate a partially updated image, and the partially updated image is xored to generate an inverse image. The negative residual error image is added to the inverse image to generate an updated inverse image, and xoring the inverse image to revert the inverse image to generate the updated image.

15 Claims, 3 Drawing Sheets

(56) References Cited

U.S. PATENT DOCUMENTS

| | | | |
|---|---|---|---|
| 7,567,617 B2* | 7/2009 | Holcomb | H04N 19/52 375/240.13 |
| 8,406,564 B2* | 3/2013 | Sun | G06T 5/003 382/240 |
| 8,523,434 B2 | 9/2013 | Tsuji | |
| 8,625,669 B2* | 1/2014 | Holcomb | H04N 19/52 375/240.13 |
| 8,750,643 B2* | 6/2014 | Sun | G06T 5/003 382/240 |
| 2002/0167597 A1* | 11/2002 | Nakano | H04N 5/217 348/223.1 |
| 2004/0086044 A1 | 5/2004 | Kondo | |
| 2005/0163218 A1* | 7/2005 | Le Clerc | G06T 7/20 375/240.16 |
| 2010/0074552 A1* | 3/2010 | Sun | G06T 5/003 382/264 |
| 2010/0098345 A1 | 4/2010 | Andersson | |
| 2010/0142791 A1 | 6/2010 | Tsuji | |
| 2011/0222781 A1 | 9/2011 | Nguyen | |
| 2011/0305364 A1* | 12/2011 | Le Barz | G06T 1/0057 382/100 |
| 2012/0051440 A1* | 3/2012 | Parfenov | H04N 19/159 375/240.26 |
| 2013/0223754 A1* | 8/2013 | Sun | G06T 5/003 382/255 |
| 2014/0010471 A1 | 1/2014 | Flanders | |
| 2014/0037206 A1 | 2/2014 | Newton | |
| 2014/0049607 A1 | 2/2014 | Amon | |
| 2014/0181635 A1 | 6/2014 | Clark | |
| 2014/0286589 A1 | 9/2014 | Amon | |

* cited by examiner

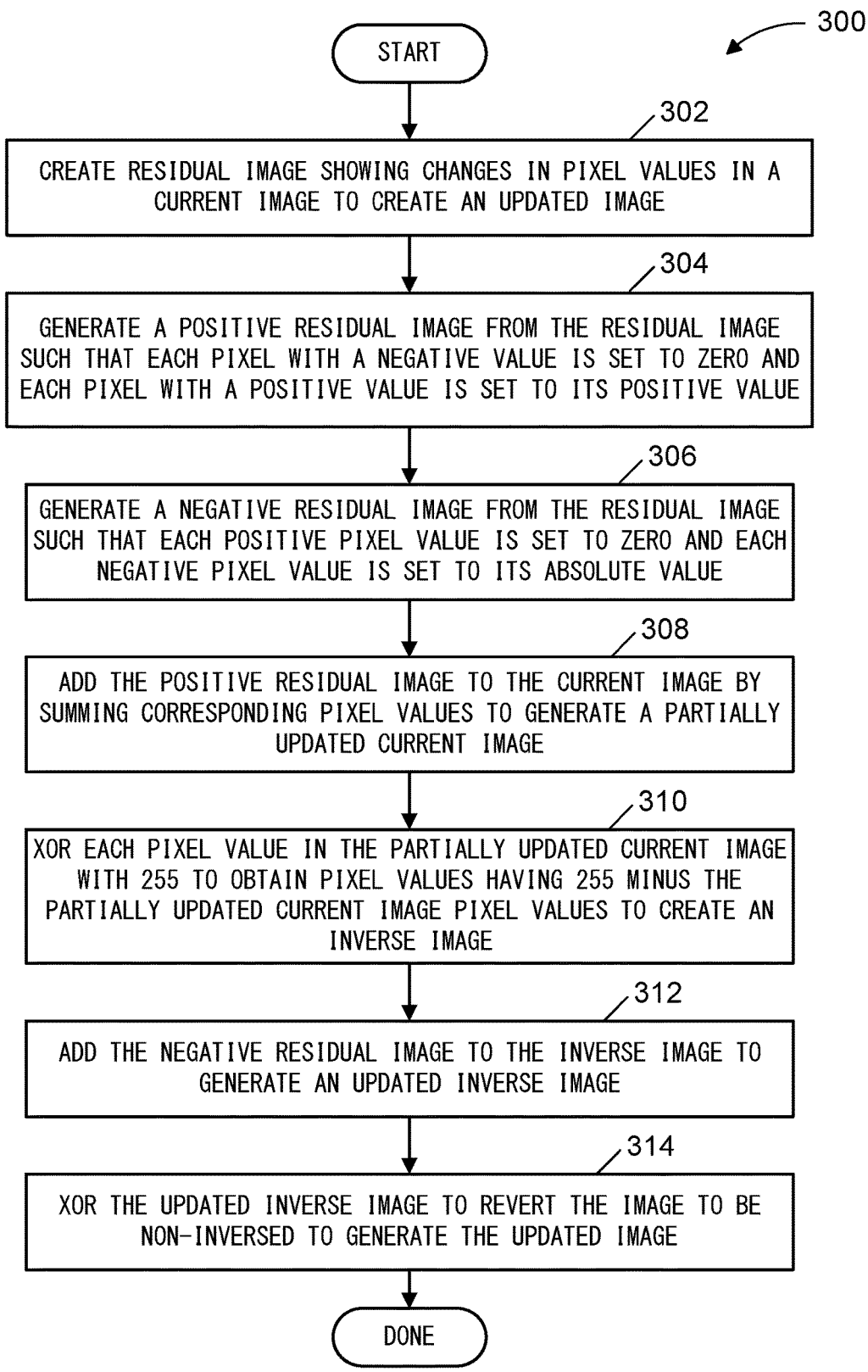

SYSTEMS AND METHODS FOR APPLYING A RESIDUAL ERROR IMAGE

CROSS REFERENCE TO RELATED APPLICATIONS

This application is a continuation of and claims priority to U.S. patent application Ser. No. 13/725,127, filed on Dec. 21, 2012, the entire contents of which are hereby incorporated by reference.

BACKGROUND

An important aspect of most methods for compressing sequences of digital video images is motion analysis. In typical motion analysis, a target image in a sequence of images is divided into a plurality of blocks of pixels. A target region that includes at least one pixel block is selected from the target image. The image preceding the target image is analyzed pixel by pixel in order to locate a region of the preceding image that closely matches the target region of the target image. Block matching techniques based on mean-square-error or mean-absolute-error are typically used to locate the region of the preceding image that closely matches the target region of the target image. If no motion has occurred, the preceding and target regions will have the same coordinates within the image frame. If motion has occurred, the preceding region will be offset or translated relative to the target region by an amount that is represented by a displacement vector. This process is typically repeated for each target region in the target image, thereby yielding a displacement vector for each target region. These displacement vectors are thereafter applied to a previous reconstructed image to form a predicted image. An error image is formed from the difference (residual errors) between the target image and the predicted image. The displacement vectors and the residual error image are then encoded for subsequent use by a decoder in decoding the compressed digital video signal.

However, current compression/decompression processes are difficult to implement efficiently in a resource-constrained or browser-based client. For example, with a browser based client executing JavaScript™ ("JavaScript"), current compression/decompression processes are difficult to implement efficiently because JavaScript is too slow to operate on individual pixels at high resolution with high frame rates. Further, a HyperText Markup Language (HTML) canvas does not provide a mechanism to add a residual error image to the canvas.

BRIEF DESCRIPTION

Systems and methods described herein enable a residual error image to be added and rendered in an existing HyperText Markup Language (HTML) canvas using native primitives. A current image and a residual error image are received, wherein the residual image contains pixel value differences between the current image and an updated image. A positive residual error image is generated from the residual error image, wherein the positive residual error image has a zero in place of each corresponding pixel value in the residual error image that is negative, and the positive residual error image has a corresponding positive value of each corresponding pixel value in the residual error image that is positive. A negative residual error image is generated from the residual error image, wherein the negative residual error image has a zero in place of each corresponding pixel value in the residual error image that is positive, and the negative residual image has a corresponding absolute value of each corresponding pixel value in the residual error image that is negative. The positive residual error image is added to the current image to generate a partially updated image, and the partially updated image is xored to generate an inverse image. The negative residual error image is added to the inverse image to generate an updated inverse image, and the inverse image is xored to revert the inverse image to generate the updated image.

BRIEF DESCRIPTION OF THE DRAWINGS

FIG. 3 is an exemplary method for applying a residual error image to an HTML canvas.

DETAILED DESCRIPTION

Figure 1:
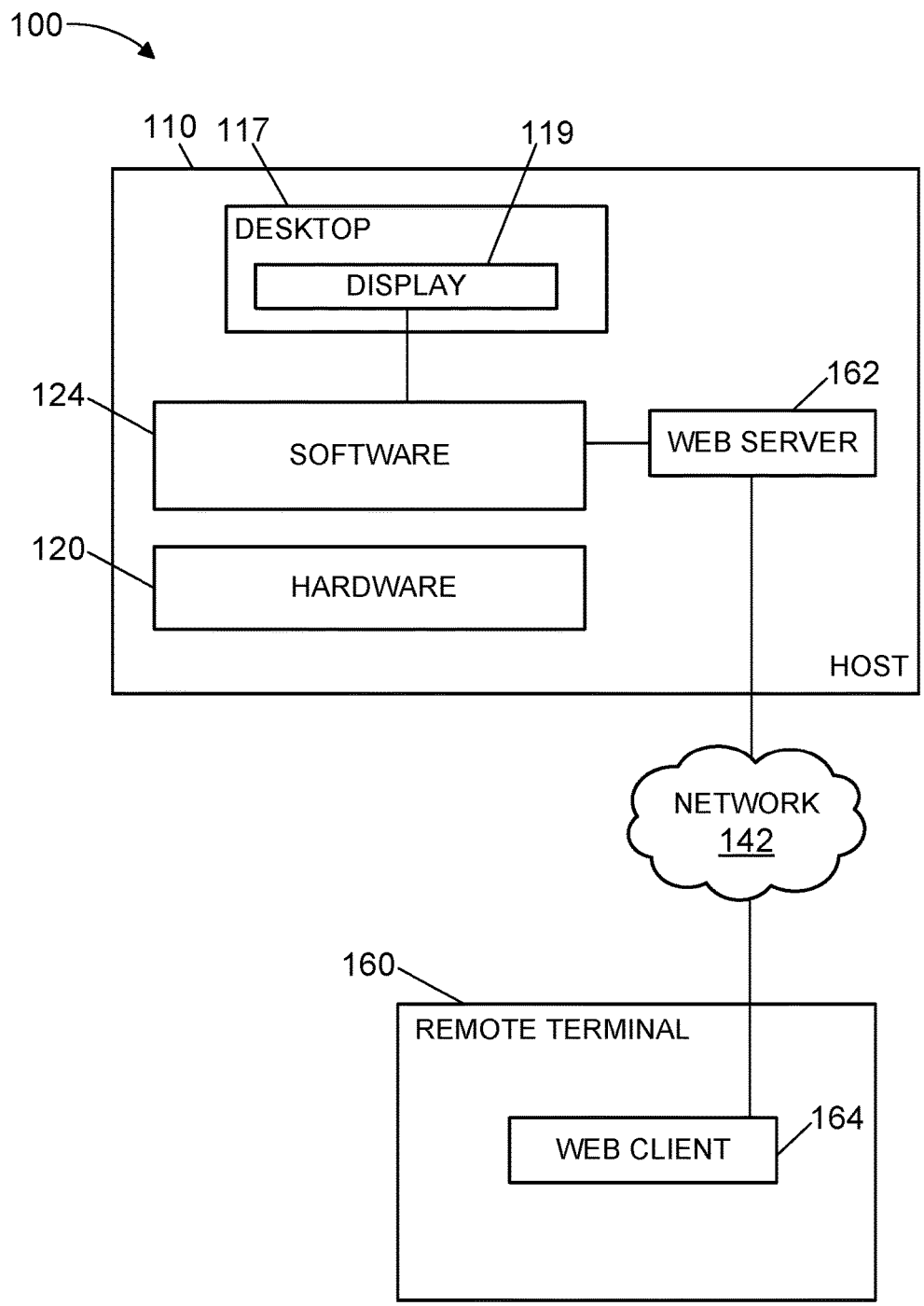
FIG. 1 is an exemplary system having a server in communication with a client.

FIG. 1 shows an exemplary system 100 that includes a physical computer system or host 110. Host 110 includes hardware 120 and software 124 running on the hardware 120 such that various applications may be executing on hardware 120 by way of software 124. Software 124 may be implemented directly in hardware 120, e.g., as a system-on-a-chip, firmware, FPGA, etc. Hardware 120 includes at least one processor (not shown), wherein each processor is an execution unit, or "core," on a microprocessor chip. Hardware 120 also includes a system memory (not shown), which is a general volatile random access memory (RAM), a network interface (NIC), and other devices.

In the exemplary embodiment, an end user may connect to, and interact with, host 110 using a remote terminal 160 that is capable of communicating with host 110 via a network 142, which may be the Internet, a LAN, a WAN, or any combination thereof. Remote terminal 160 may be a desktop computer, laptop, mobile device, thin client, or other similar device. Remote terminal 160 is capable of displaying applications running inside host 110 to the end user using a computer display (not shown) or similar device. Remote terminal 160 is also capable of receiving user input from the end user and transmitting the received user input to host 110.

Host 110 provides at least one desktop 117 (only one being shown in FIG. 1) for access by an end user. In a virtual desktop infrastructure (VDI) deployment, each desktop 117 may be exported from a corresponding one of a plurality of virtual machines (not shown) to a plurality of users in disparate remote locations that access the desktop using a remote terminal such as remote terminal 160. Desktop 117 is an interactive user environment provided by the applications running within host 110, and internally generates displays 119 (only one being shown in FIG. 1) which may or may not be presented at host 110. Desktop 117 may generate other outputs, such as audio, indicator lamps, tactile feedback, etc. Desktop 117 also accepts input from the user in the form of device inputs, such as keyboard and mouse inputs. These inputs may be simulated inputs, such as simulated keyboard and mouse inputs transmitted from remote terminal 160. In addition to user input/output, desktop 117 may send and receive device data, such as input/output for a FLASH memory device local to the user, or to a local printer. In the exemplary embodiment, display 119 may be presented to an end user on a computer display (not shown) of remote terminal 160.

In the exemplary embodiment, host 110 also includes a server (e.g., web server 162) that is in communication with software 124. Web server 162 is also in communication with remote terminal 160 and a client (e.g., web client 164) via network 142. In some implementations, web server 162 may also be implemented on a stand-alone server (not shown). Web client 164, in the exemplary embodiment, is a web browser that is configured to run on remote terminal 160 and connects to web server 162 as necessary. In the embodiments described herein, web client 164 is an HTML (e.g., HTML5) browser based client that executes JavaScript.

System 100 may be implemented on a physical desktop computer system, such as a work or home computer that is remotely accessed when travelling. Alternatively, system 100 may be implemented on a virtual desktop infrastructure (VDI) that has a plurality of virtual machines (VMs) (not shown) on host 110. In the latter case, software 124 may be virtualization software and one or more VMs (not shown) may be executing on hardware 120 by way of the virtualization software. It should therefore be understood that the present invention can be implemented in a variety of contexts, but may be particularly useful wherever graphical user interface display remoting is implemented.

During operation of system 100, as explained in more detail below with respect to FIG. 2, a residual error image is created by web server 162 such that the residual error image can be quickly decoded and rendered by web client 164. It should be recognized that, while the description below references implementation using a web server and a web client (browser), other server-client implementations are possible and are contemplated. In general, upon receiving a web request that corresponds to a request for a video from web client 164, web server 162 receives the video from desktop 117.

In one embodiment, to create a residual error image that can be decoded and rendered in an HTML browser based client (e.g., web client 164), initially, web server 162 separates a reference frame of the video into a plurality of macro-blocks of pixels. In the embodiments described herein, a macro-block of pixels may include two or more blocks of pixels with dimensions that are a power of two (e.g., 2, 4, 8, 16, 32) for each dimension. In the following examples, a macro-block of pixels has a dimension of 16 pixels by 16 pixels.

After a frame (e.g., a reference frame) of the video has been separated into a plurality of macro-blocks, each of the macro-blocks in the reference frame is compared to macro-blocks in other frames of the video (e.g., previous frames and future frames). Based on the comparing, macro-blocks in the other frames of the video that match the macro-blocks in the reference frame are identified. In one embodiment, the matching macro-blocks may not be an exact match. Rather, the matching macro-blocks are substantially matching or are a close enough match to be considered a matching macro-block. For example, a macro-block from another frame is considered to be substantially matching or a close enough match to a macro-block in the reference frame macro-block if the similarities between each macro-block are above a defined threshold.

After web server 162 determines which of the macro-blocks in the reference frame have matching macro-blocks in other frames, each of the matching macro-blocks is subtracted from the corresponding matching macro-blocks. As a result of subtracting two macro-blocks from each other, positive and negative pixel values are achieved (e.g., approximately 50% positive and 50% negative on average). However, while JavaScript provides a means for adding an image to an existing HTML canvas using an additive operation, JavaScript does not provide a means to apply negative numbers (e.g., subtract pixel values from an image). As explained in further detail below with respect to FIG. 2, an embodiment of the present disclosure resolves the problem of adding negative values by using native primitives to apply a residual error image to an HTML canvas.

Figure 2:
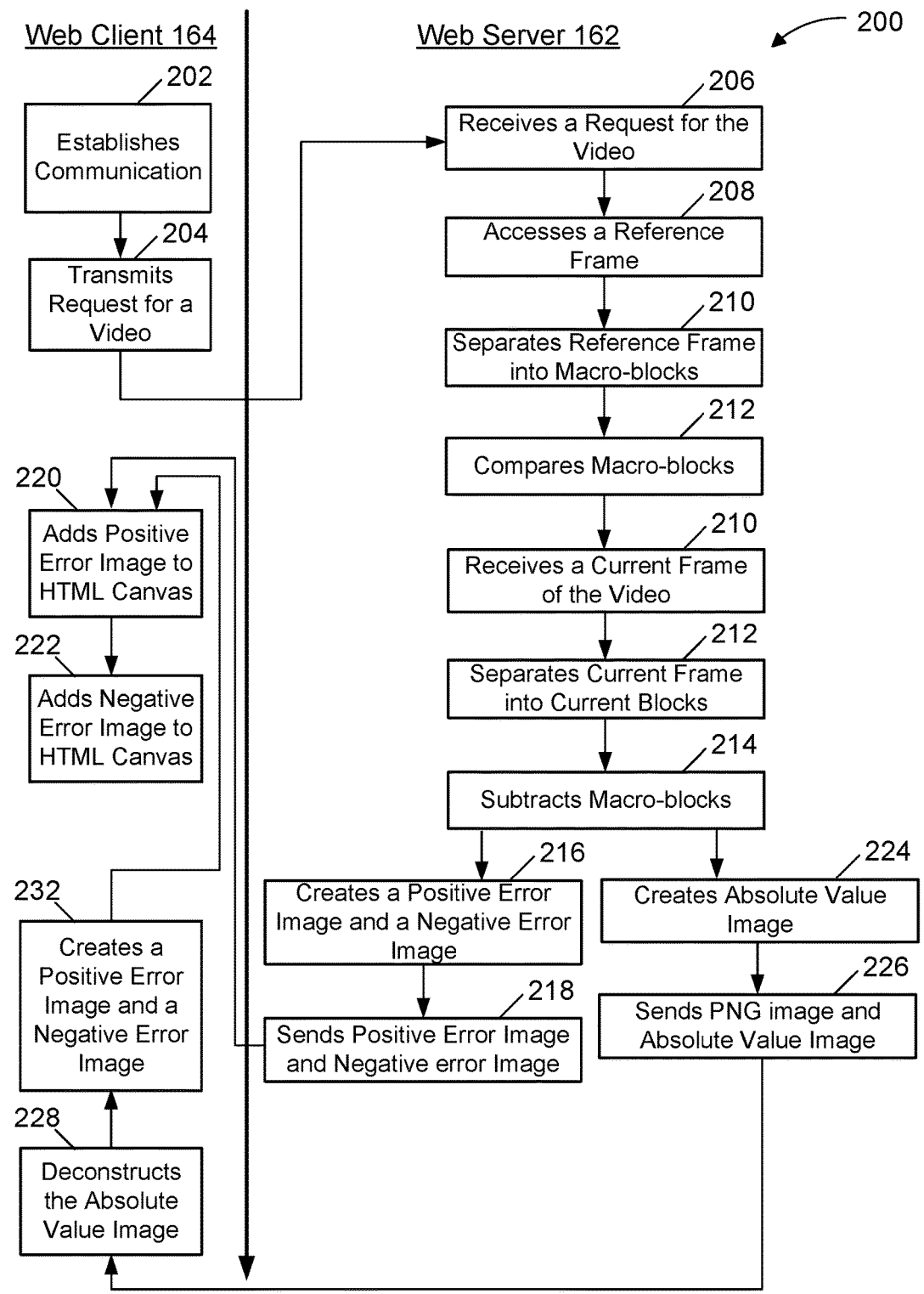
FIG. 2 is a swimlane diagram of an exemplary method for applying a residual error image to a HyperText Markup Language (HTML) canvas.

FIG. 2 and FIG. 3 each show exemplary methods 200 and 300, respectively, for applying a residual error image to an HTML canvas. More specifically, a residual error image is created by a server (e.g., web server 162) located within host 110 (shown in FIG. 1) such that the residual error image can be applied to an HTML canvas by web client 164 located within remote terminal 160 (shown in FIG. 1). These methods may be embodied within a plurality of computer-executable instructions stored in one or more memories, such as one or more computer-readable storage mediums. Computer storage mediums may include non-transitory and include volatile and nonvolatile, removable and non-removable mediums implemented in any method or technology for storage of information such as computer-readable instructions, data structures, program modules or other data. The instructions may be executed by one or more processors to perform the functions described herein.

Referring first to FIG. 2, in operation 202, web client 164 establishes one or more communication channels with web server 162, wherein the channel(s) facilitate communication between web client 164 and web server 162. More specifically, in operation 204, web client 164 transmits a request for a video. In operation 206, the request for the video is received by web server 162. However, prior to sending the video to web client 164, a residual error image is created for one or more frames of the video by web server 162 using macro-block matching. More specifically, and as shown in operation 302 of FIG. 3, web server 162 creates a residual error image that shows changes in pixel values in a current image to create an updated image.

With reference back to FIG. 2, in operation 208, web server 162 accesses a reference frame (e.g., a previous frame) of an image in the video. In operation 210, web server 162 separates the reference frame into a plurality of macro-blocks of pixels. A macro-block of pixels may include two or more blocks of pixels with dimensions that are a power of two (e.g., 2, 4, 8, 16, 32) for each dimension. In the exemplary embodiment, a macro-block of pixels has a dimension of 16 pixels by 16 pixels.

In operation 212, web server 162 compares the macro-blocks to determine which of the reference frame macro-blocks substantially match a macro-block from another frame of the video. In one embodiment, the matching macro-blocks may not be an exact match. Rather, the matching macro-blocks are substantially matching or are a close enough match to be considered a matching macro-block. For example, a macro-block from another frame is considered to be substantially matching or a close enough match to a macro-block in the reference frame macro-block if the similarities between each macro-block are above a defined threshold. In operation 214, web server 162 creates a residual error image for a particular reference frame by subtracting pixel values in each of the reference frame macro-blocks from pixel values in corresponding substantially matching macro-blocks. This results in positive and negative pixel values (e.g., approximately 50% positive and 50% negative on average). However, as explained above, JavaScript provides a means for adding an image to an existing HTML canvas using an additive operation. JavaScript does not provide a means to apply negative numbers (e.g., subtract pixel values from an image).

A first example of resolving the issue of using an additive operation on negative values will be described with reference to operations 216-222 wherein the residual image is sent to web client 164 as a pair of images. More specifically, in operation 216, web server 162 creates an image that includes the negative error pixel values and another image that includes the positive error pixel values. For example, as shown in operation 304 of FIG. 3, web server 162 generates a positive residual image from the residual error image such that each pixel with a negative value is set to zero and each pixel with a positive value is set to its positive value. In operation 306, web server 162 generates a negative residual image from the residual error image such that each positive pixel value is set to zero and each negative pixel value is set to its absolute value.

With reference back to FIG. 2, in operation 218, each of the positive residual image and the negative residual image are sent to web client 164. As a result of having a residual image being represented by two separate images (e.g., the positive residual image and the negative residual image), each of the separate images may be applied to a current image on the HTML canvas separately by web client 164. In one embodiment, and as shown in operation 308 of FIG. 3, the positive residual image is added to the HTML canvas (e.g., a current image) by summing corresponding pixel values to generate a partially updated current image using native primitives (e.g., Javascript adding operation). For example, as shown in operation 220 of FIG. 2, the positive error image is added to the HTML canvas using the globalCompositeOperation attribute, which sets how shapes and images are drawn. More specially, the positive error image is added using context.globalCompositeOperation='lighter', which instructs a destination image having pixel values each equaling the sum of pixel values at corresponding locations in the source image and the positive error image to be displayed. The destination image, which should correspond with the original "next frame" image at the host, should not have any pixels exceeding 255 luminance or either color difference block; where lossy compression would results in a value greater than 255, however, the value is set to 255. As such, the positive error values are added to the HTML canvas. For example, in one embodiment, the positive error value of a pixel may be 40 and a current image on the HTML canvas may have the corresponding pixel value of 80. Because the positive error value 40 represents a difference between the reference frame pixel value and the corresponding pixel value on the HTML canvas, the value of 40 is added to the current pixel value of 80 using the JavaScript adding operation. As a result, the corresponding pixel in the current image on the HTML canvas now has a value of 120 (i.e., 40+80) after the positive error pixel value of 40 is added to the HTML canvas. This procedure is repeated for each of the red, green, and blue blocks the RGB color space, and as a result, the current image on the HTML canvas is partially updated.

Next, and as shown in operation 310 of FIG. 3, each pixel value in the partially updated current image on the HTML canvas is "xored" (e.g., the pixel values are inversed) with 255 to obtain pixel values having 255 minus the partially updated current image pixel values. This creates an inverse image of the current image on the HTML canvas in order to prepare the canvas for the addition of the negative error values from the addition of the negative residual image. In one embodiment, each color value of the current image on the HTML canvas is inversed by filling the HTML canvas using context.globalCompositeOperation='xor' (e.g., exclusive OR of the source image and destination image). The 'xor' operation is then executed because the HTML canvas does not support a subtractive operation. For example, a negative error pixel value may be 40 (i.e., −40) and a corresponding pixel value in the current image on the HTML canvas may have a value of 80. The value of 40 may not merely be subtracted from 80 because JavaScript does not support a subtracting operation. Thus, to overcome this issue, each pixel color value is binary-xored with the color value 255, corresponding to binary 1111 1111. When an arbitrary 8-bit number is xored with 255, the binary representation of the original number is changed so that all the bits set to zero are changed to 1 and all the bits set to 1 are changed to zero. The net effect of this computation is to subtract the original number from 255 and create an inverse image, akin to a "color negative." That is, the pixel value of 80 is now a pixel value of 175 (e.g., 255-80). With the HTML canvas being xored with 255 in operation 222, the negative residual image is added to the HTML canvas using context.globalCompositOperation='lighter'. That is, the absolute value of negative error pixel value of 40 described above is added to the now corresponding pixel value of 175. As a result, the corresponding pixel value in the current image is 215 (i.e., 175 plus 40). As shown in operation 312 of FIG. 3, adding the negative residual image to the inversed current image on the HTML canvas generates an updated inverse image. In operation 314, the updated inverse image is xored to revert the inversed image to be non-inversed (e.g., an updated current image). For example, with reference back to FIG. 2, in operation 226, the HTML canvas is xored with 255 again using context.globalCompositeOperation='xor'. As such, the current image pixel value of 215 is now inversed to be a value of 40 (e.g., 255−215). Therefore, by using the xor operation in this manner, the current image pixel values on the HTML canvas are the same values that would have been achieved if JavaScript were enabled to support a subtraction operation.

A second example of resolving the issue of using an additive operation on negative values will be described with reference to operations 224-232 in FIG. 2, wherein a residual image is sent to web client 164 as a single image. More specifically, in operation 224, web server 162 creates an image that represents the negative error values and the positive error values as absolute values. However, in order for web client 164 to determine which of the absolute values in the image are, in fact, positive error values and negative error values, a Portable Network Graphics (PNG) image is created and sent to web client 164 with a 1-bit alpha mask in operation 226. The 1-bit alpha mask can be used by web client 164 to deconstruct the positive and negative error images. Thus, when web client 164 receives the single image with absolute values for the negative error values and the positive error values, web client deconstructs the single image in operation 228. Thereafter, in operation 232, web client 164 separates the deconstructed image into an image with negative error pixel values and another image with the positive error pixel values that are based on the deconstructed single image. To apply each of the images to the HTML canvas, operations 220-222 are performed.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
   receiving a request for a video from a client;
   creating a respective residual error image for each of one or more images of the video, wherein each residual error image shows changes in pixel values in a current image to create an updated image; and
   for each residual error image:
      generating a positive residual error image from the residual error image that contains the positive error pixel values of the residual error image,
      generating a negative residual error image from the residual error image that contains the negative error pixel values of the residual error image,
      providing the residual error image to the client as the pair of the positive error image and the negative error image for application to the current image to display the updated image.

2. The method of claim 1, wherein the positive residual error image has a zero in place of each corresponding pixel value in the residual error image that is negative and a corresponding positive value of each corresponding pixel value in the residual error image that is positive.

3. The method of claim 1, wherein the negative residual error image has a zero in place of each corresponding pixel value in the residual error image that is positive and a corresponding absolute value of each corresponding pixel value in the residual error image that is negative.

4. The method of claim 1, wherein creating the residual error image for an image of the video includes using macro-block matching.

5. The method of claim 4, wherein the macro-block matching results in positive and negative pixel values.

6. A method comprising:
   transmitting a request for a video from a server;
   receiving a positive residual error image generated using positive error values of a residual error image and a negative residual error image generated from negative error values of the residual error image; and
   separately applying the positive residual error image and the negative residual error image to a current image of the video to generate an updated image of the video.

7. The method of claim 6, wherein the positive residual image has a zero in place of each corresponding pixel value in the residual error image that is negative and a corresponding positive value of each corresponding pixel value in the residual error image that is positive.

8. The method of claim 6, wherein the negative residual image has a zero in place of each corresponding pixel value in the residual error image that is positive and a corresponding absolute value of each corresponding pixel value in the residual error image that is negative.

9. The method of claim 6, wherein applying the positive residual error image and the negative residual error image to a current image of the video comprises:
summing the pixel values of the positive residual error image to corresponding pixel values of the current image;
xoring the partially updated image to generate an inverse image;
summing the pixel values of the negative residual error image to corresponding pixel values of the inverse image to generate an updated inverse image; and
xoring the inverse image to revert the inverse image to generate the updated image of the video.

10. A method comprising:
transmitting, by a client, a request for a video from a server;
receiving an absolute value image generated from a residual error image of an image of the video;
receiving a portable network graphics (PNG) image with a 1-bit alpha mask;
using the PNG image to deconstruct positive and negative error values from the absolute value image to generate a positive error image and a negative error image; and
applying the positive residual error image and the negative residual error to a current image of the video to generate an updated image of the video.

11. The method of claim 10, wherein the absolute value image includes an absolute value of the pixel value differences between the current image and the updated image.

12. The method of claim 10, wherein the 1-bit alpha mask allows the positive error pixel values and negative error pixel values from the absolute value residual image to be deconstructed.

13. The method of claim 10, wherein the positive residual image has a zero in place of each corresponding pixel value in the residual error image that is negative and a corresponding positive value of each corresponding pixel value in the residual error image that is positive.

14. The method of claim 10, wherein the negative residual image has a zero in place of each corresponding pixel value in the residual error image that is positive and a corresponding absolute value of each corresponding pixel value in the residual error image that is negative.

15. The method of claim 10, wherein applying the positive residual error image and the negative residual error image to a current image of the video comprises:
summing the pixel values of the positive residual error image to corresponding pixel values of the current image;
xoring the partially updated image to generate an inverse image;
summing the pixel values of the negative residual error image to corresponding pixel values of the inverse image to generate an updated inverse image; and
xoring the inverse image to revert the inverse image to generate the updated image of the video.

* * * * *